US010872374B2

(12) United States Patent
Caldwell

(10) Patent No.: US 10,872,374 B2
(45) Date of Patent: Dec. 22, 2020

(54) DYNAMICALLY RESIZING BUBBLES FOR DISPLAY IN DIFFERENT-SIZED TWO-DIMENSIONAL VIEWING AREAS OF DIFFERENT COMPUTER DISPLAY DEVICES

(75) Inventor: John Ryan Caldwell, Provo, UT (US)

(73) Assignee: MX TECHNOLOGIES, INC., Lehi, UT (US)

( * ) Notice: Subject to any disclaimer, the term of this patent is extended or adjusted under 35 U.S.C. 154(b) by 414 days.

(21) Appl. No.: 13/507,601

(22) Filed: Jul. 12, 2012

(65) Prior Publication Data
US 2014/0164198 A1 Jun. 12, 2014

(51) Int. Cl.
*G06Q 40/00* (2012.01)
(52) U.S. Cl.
CPC .................. *G06Q 40/00* (2013.01)
(58) Field of Classification Search
USPC .......................................................... 705/35
See application file for complete search history.

(56) References Cited

U.S. PATENT DOCUMENTS

| 5,528,735 | A  | * | 6/1996 | Strasnick | G06F 3/04815 |
| | | | | | 345/427 |
| 6,812,926 | B1 | * | 11/2004 | Rugge | G06T 11/206 |
| | | | | | 283/115 |
| 6,822,662 | B1 | * | 11/2004 | Cook | G06F 3/04842 |
| | | | | | 345/649 |
| 7,050,997 | B1 | | 5/2006 | Wood | |
| D582,934 | S | | 12/2008 | Byeon | |
| D613,301 | S | | 4/2010 | Lee | |
| 8,327,395 | B2 | * | 12/2012 | Lee et al. | 725/10 |
| 8,380,623 | B1 | | 2/2013 | Ley et al. | |
| D682,305 | S | | 5/2013 | Mierau | |
| D682,880 | S | | 5/2013 | Koehn et al. | |
| D692,457 | S | | 10/2013 | Abratowski et al. | |
| D693,838 | S | | 11/2013 | Gardner et al. | |
| D694,767 | S | | 12/2013 | Edwards et al. | |
| D696,264 | S | | 12/2013 | d'Amore | |
| D696,265 | S | | 12/2013 | d'Amore | |
| D697,935 | S | | 1/2014 | Lee | |
| D699,249 | S | | 2/2014 | Fujii | |
| D699,250 | S | | 2/2014 | Fujii et al. | |
| D704,204 | S | | 5/2014 | Rydenhag | |
| D706,301 | S | | 6/2014 | Akana | |
| D706,302 | S | | 6/2014 | Akana | |
| D708,193 | S | | 7/2014 | Agnew et al. | |
| D717,823 | S | | 11/2014 | Brotman | |
| D721,086 | S | | 1/2015 | Hontz | |

(Continued)

OTHER PUBLICATIONS

Jeremy, Bundle Rolls Out New Features: Now You Can Track Your Own Spending and Create a Budget, https://web.archive.org/web/20110227205355//http://genxfinance.com/bundle-rolls-out-new-budgeting-features, Feb. 27, 2011.*

(Continued)

*Primary Examiner* — Abhishek Vyas
(74) *Attorney, Agent, or Firm* — Kunzler Bean & Adamson, PC

(57) ABSTRACT

Intuitively understandable visual representations of personal budgeting information are provided by creating proportionate bubble graphics for portions of a budget, each graphic having a visual size depiction proportionate to its percentage of the total budget being considered.

20 Claims, 15 Drawing Sheets

(56) References Cited

U.S. PATENT DOCUMENTS

| | | | |
|---|---|---|---|
| D728,615 S | 5/2015 | Guzman | |
| D735,754 S | 8/2015 | Chaudhri | |
| D736,219 S | 8/2015 | Petersen | |
| D737,278 S | 8/2015 | Shin | |
| D737,319 S | 8/2015 | Cavander | |
| D738,382 S | 9/2015 | Lim | |
| D738,385 S | 9/2015 | Lim | |
| D739,425 S | 9/2015 | Shawki | |
| D740,307 S | 10/2015 | McAllister | |
| D750,660 S | 3/2016 | Caldwell | |
| D751,108 S | 3/2016 | Caldwell | |
| D752,083 S | 3/2016 | Caldwell et al. | |
| 2004/0221258 A1* | 11/2004 | Devore et al. | 717/102 |
| 2005/0229110 A1 | 10/2005 | Gegner et al. | |
| 2006/0236264 A1 | 10/2006 | Cain et al. | |
| 2007/0149252 A1 | 6/2007 | Jobs et al. | |
| 2007/0260532 A1* | 11/2007 | Blake, III | G06Q 40/00 705/35 |
| 2008/0163119 A1 | 7/2008 | Kim | |
| 2008/0245854 A1* | 10/2008 | Monden | 235/379 |
| 2008/0256444 A1* | 10/2008 | Wang | G06F 17/30864 715/700 |
| 2009/0018996 A1* | 1/2009 | Hunt et al. | 707/2 |
| 2009/0048957 A1 | 2/2009 | Celano | |
| 2009/0094628 A1* | 4/2009 | Lee et al. | 725/10 |
| 2010/0050123 A1 | 2/2010 | Sherrard | |
| 2010/0153242 A1* | 6/2010 | Preston et al. | 705/30 |
| 2010/0268426 A1 | 10/2010 | Pathak | |
| 2010/0333029 A1 | 12/2010 | Smith | |
| 2011/0022982 A1 | 1/2011 | Takoaka | |
| 2011/0239148 A1 | 9/2011 | Setlur | |
| 2011/0271186 A1 | 11/2011 | Owens | |
| 2012/0084168 A1 | 4/2012 | Adair et al. | |
| 2012/0095887 A1* | 4/2012 | Mullen et al. | 705/30 |
| 2012/0130869 A1* | 5/2012 | Shergill et al. | 705/30 |
| 2012/0130870 A1* | 5/2012 | Shergill | G06Q 40/02 705/30 |
| 2012/0215464 A1 | 8/2012 | Daubney | |
| 2012/0323689 A1 | 12/2012 | Metcalf et al. | |
| 2013/0227450 A1 | 8/2013 | Minwook | |
| 2014/0236789 A1 | 8/2014 | Caldwell | |
| 2014/0298235 A1 | 10/2014 | Caldwell | |
| 2015/0081498 A1 | 3/2015 | Caldwell | |

OTHER PUBLICATIONS

Bundle: The No. 1 Source for How People Spend and Save Money. https://web.archive.org/web/20111004160804/http://money.bundle.com/mymoney, Oct. 4, 2011.*
Mecham, Jesse "YNAB 4: Spending by Category & Spending by Payee" (available at <youneedabudget.com/blog/2012/ynab-4-spending-by-category-spending-by-payee/>).
"YNAB 3 Review." Personal Finance Budget Software Reviews, Published: Jan. 7, 2010. Accessed: Jul. 15, 2014. <http://personalfinancesoftwarereviews.com/ynab-3-review>. (Archived on Jan. 7, 2010 by the Internet Archive at <http://web.archive.org/web/20100107125616/http://personalfinancesoftwarereviews.com/ynab-3-review>).
U.S. Office Action dated Aug. 15, 2014 in U.S. Appl. No. 13/507,602.
U.S. Office Action dated Feb. 27, 2015 in U.S. Appl. No. 13/507,602.
U.S. Office Action dated Oct. 6, 2015 in U.S. Appl. No. 13/507,602.
U.S. Office Action dated Jul. 24, 2014 in U.S. Appl. No. 13/573,356.
U.S. Office Action dated Jan. 30, 2015 in U.S. Appl. No. 13/573,356.
U.S. Office Action dated Aug. 27, 2015 in U.S. Appl. No. 13/573,356.
U.S. Office Action dated Dec. 2, 2015 in U.S. Appl. No. 29/542,985.
U.S. Office Action dated Dec. 2, 2015 in U.S. Appl. No. 29/542,986.
U.S. Appl. No. 29/542,985, filed Oct. 20, 2015.
U.S. Appl. No. 29/542,986, filed Oct. 20, 2015.
U.S. Appl. No. 29/553,412 Notice of Allowance, dated Jul. 27, 2016.
U.S. Appl. No. 29/553,415 Notice of Allowance, dated Jul. 25, 2016.
U.S. Appl. No. 29/553,416 Notice of Allowance, dated Jul. 29, 2016.
U.S. Appl. No. 29/553,422 Notice of Allowance, dated Jul. 25, 2016.
U.S. Appl. No. 29/553,425 Notice of Allowance, dated Jul. 29, 2016.
U.S. Appl. No. 29/553,431 Notice of Allowance, dated Jul. 26, 2016.
U.S. Appl. No. 29/553,434 Notice of Allowance, dated Jul. 29, 2016.
U.S. Appl. No. 29/553,436 Notice of Allowance, dated Jul. 26, 2016.
U.S. Appl. No. 29/553,437 Notice of Allowance, dated Jul. 25, 2016.
U.S. Appl. No. 13/507,602, Final Office Action, dated Sep. 6, 2016.
U.S. Appl. No. 13/573,356, Final Office Action, dated Apr. 21, 2016.
U.S. Appl. No. 29/553,409 Notice of Allowance, dated Jul. 14, 2016.
U.S. Appl. No. 29/553,418 Notice of Allowance, dated Jul. 21, 2016.
Derr, Andrew. "Shutter Stock—Image ID: 255006682." Shutter Stock., Jul. 11, 2012 [online], [retrieved on Jul. 8, 2016]. Retrieved from the Internet <URL: http://www.shutterstock.com/pic-255006682.html>.
3Art, Shutter Stock—Image ID: 300077855.: Shutter Stock., May 24, 2011 [online], [retrieved on Jul. 8, 2016]. Retrieved from the Internet <URL: http://www.shutterstock.com/pic-300077855.html>.
Mikhail_grachikov. "Deposit Photos—Stock Illustration #80752382." Deposit Photos., Jan. 18, 2012 [online], [retrieved on Jul. 8, 2016]. Retrieved from the Internet <URL: http://depositphotos.com/search/control-hub.html?AVXU2sVNbX8y4zPKyYK_=&qview=80752382>.
India Investment News, Moven Partners with MoneyDesktop to Use Industry Leading API, published Mar. 13, 2014, obtained on LexisNexis at <https://advance.lexis.com/api/permalink/bc648d99-52bb-4a4e-a66f-99642f4282c3/?context=1000516>.
PRWeb Newswire, MoneyDesktop Becomes Premier Data Provider for iQuantifi, published Sep. 11, 2014, http://www.prweb.com/releases/2014/09/prweb12163337.htm.
BusinessWire, Q2 Partners with MX to Launch Contextual PFM Engine for Community Financial Institutions, published Aug. 1, 2016, available at http://www.businesswire.com/news/home/20160801005244/en/.
U.S. Appl. No. 13/573,356 Office Action dated Feb. 23, 2017.
U.S. Appl. No. 13/507,602 Office Action dated Apr. 3, 2017.
United States Patent and Trademark Office, Final Office Action, dated Apr. 6, 2016, 22 pages, in U.S. Appl. No. 13/507,602.
United States Patent and Trademark Office, Notice of Allowance, dated Jan. 22, 2016 7 pages, in U.S. Appl. No. 29/542,985.
United States Patent and Trademark Office, Notice of Allowance, dated Jan. 29, 2016, 7 pages, in U.S. Appl. No. 29/542,986.
U.S. Appl. No. 13/573,356 Final Office Action dated Aug. 9, 2017.

* cited by examiner

BUDGET CATEGORY: AUTO

Expense #304k

For: Transmission rebuild, 2001 Honda

Amount: $1,867.93

Date: June 21, 2012

DYNAMICALLY RESIZING BUBBLES FOR DISPLAY IN DIFFERENT-SIZED TWO-DIMENSIONAL VIEWING AREAS OF DIFFERENT COMPUTER DISPLAY DEVICES

BACKGROUND

In the prior art, there have been numerous attempts to provide computer software budget management tools. Many of those tools graphically represent budget data using bar graphs and pie charts. Neither has proven satisfactory, as explained below.

Referring to FIG. 1a, an example bar graph 101 depicting personal budget data is shown. The bar graph shows budget categories for auto expenses 102, home expenses 103, food 104, and recreation or fun 105 for a chosen period of time, such as the current month or current year. Within each budget category, the bar graph depicts total budget amount for that category versus amount spent to date. For example, for auto expenses 102, a person can view actual auto expenses 102a versus budgeted auto expenses 102b in order to visually determine whether the person is under budget or over budget in that category. For the home budget category 103, the person in question has spent more on home expenses 103a than budgeted 103b, and that overage is depicted in the bar graph. The bar graph may also show budgeted amount versus actual amount spent in numeric form such as depicted with reference numerals 102c, 103c, 104c and 105c. Note that a fine level of detail of graphic display is necessary for a bar graph depiction, something that may not be available with graphic compaction such as on a hand held computing device. Also, the bar graph shows all budget categories being the same size, although undoubtedly some are larger than others. Thus a small budget overage in a small budget category such as food may appear to be equal to a large dollar overage in another category such as home expenses, although they are not at all equal. This can tend to mislead a user who relies on visual representation of the data.

It has also been recognized in the prior art that it is desirable to be able to warn a user when a budget item is approaching the budgeted amount, and to again warn a user when a budgeted item has exceeded the budgeted amount. For example, if a user's recent coffee purchases have caused a user to approach the budgeted amount for food expenses, then a warning to that user will be helpful to remind the user to cut back on or otherwise control expenses in that category. As another example, if a user's recent automobile repair bills have caused his or her budget for automobile expenses to be exceeded, then a warning to the user is appropriate so that the user can plan to cut back on other expenses, such as entertainment or clothing, in order to stay within budget overall.

Prior art software systems attempted to provide such warnings to users by colorizing budget data. As an example, expenses in a particular budget category which were approaching the budgeted amount were highlighted in yellow, while expenses that exceeded the budgeted amount for a particular budget category were shown in red.

Bar graphs may be depicted horizontally as in FIG 1a or vertically if desired, such as shown in FIG. 1b. That figure shows budgets in relative size to each other. However, as budgets increase in size, one category will tend to dwarf the others, making all but the largest budget categories very difficult to visually comprehend with this type of data representation.

One attempt to resolve difficulties with bar graphs is to group budgets of similar size together. This is depicted in FIG. 1c. In this example, greater than $1,000 budgets 110, such as auto 111 and home 112 are grouped together. Likewise, small budgets such as less than $30 budgets 113 such as fun 114 and internet 115 are grouped together. This is an attempt to resolve the problems inherent in bar graphs.

Regardless, bar graphs face serious drawbacks. First, if a particular budget is large compared to the others depicted on a bar graph, then the budget items which are not large must be shrunk to accommodate a large graphic for the large budget. This makes the budgets that are not large difficult to see and difficult to visually interpret, especially on a mobile electronic device. Second, bar graphs must utilize the same space to depict actual expenses versus budgeted expenses for any particular budget line item. This makes the budget line items difficult to see and understand. Third, bar graphs are not intuitive. Rather than glancing at a bar graph budget versus actual expense depiction and immediately understanding the budgetary situation, users tend to stare at the bar graphs, considering whether a particular expense might be ⅔ budget, ¾ budget, etc. Some users even find that numerical data is easier to comprehend than bar graphs.

An alternative to bar graphs which is known in the prior art is the pie chart. FIG. 2 depicts an example of pie charts 201 used to depict personal budget data. The pie charts show budget categories for home expenses 202, auto expenses 203, food expenses 204, and miscellaneous expenses 205 for a chosen period of time, such as the current month or current year. Within each budget category, a pie chart depicts the total budget amount for that category versus amount spent to date (shaded). Pie charts allow a person to visually determine whether the person is under budget or over budget in any particular budget category.

There are numerous problems with pie charts. First, there is a limit to the amount of information that can be depicted on a single pie chart before it becomes too crowded and complicated for easy understanding, Second, due to the size and complexity limits inherent in pie charts, in many instances all data desired cannot be represented on a single pie chart. Therefore multiple pie charts are used, making the data presentation complex when the whole purpose of using a pie chart in the first place was to simplify data presentation. A third problem with pie charts is that it can be difficult to show actual expenses versus budget amounts.

The above problems of prior art methods for graphically depicting personal budget information are compounded by two additional factors. First, a typical computer software budgeting package will include more than just budgetary graphics on a single page or screen. Therefore, the budgetary graphics must be shrunk into only a minor portion of a computer display device, consequently compounding the problems already mentioned. Second, many users would like to access their budgeting software on a mobile electronic device, such as a so-called smart phone. Mobile electronic devices tend to have compact display devices or screens, requiring further compression of budgetary graphics, rendering some prior art budgeting software unusable in such environments. Other problems with graphical representation of personal budgetary data will be known to persons of ordinary skill in the field.

Overall, the prior art struggled with how to show the relativeness of budget data in a manner that is intuitive, easy to understand, and may be depicted on a small display device, or a small portion of a larger display device.

SUMMARY

When the invention is implemented, budgetary information is depicted as two-dimensional or three-dimensional bubble or spheroid graphical objects or other similar shape. The shape, bubble or spheroid could be oval, elliptical, circular, spherical, ball-shaped, an orb, rounded, round, annular, or otherwise shaped within the spirit of this meaning. For shorthand reference, such two-dimensional and three-dimensional depiction of budgetary information will simply be referred to as bubbles.

When bubbles are used to graphically depict budgetary information, there are some natural consequences which are advantageous to the user. First, upon viewing bubble representation of personal budgetary data, it is both intuitive to the user and immediately apparent whether the limits of a particular budget category have been met or exceeded because the relative size of the bubbles is very easy to discern.

Second, the budgeted amount may be shown as a first bubble, with actual expenses shown as a second bubble. If actual expenses are less than budget, then the actual expense bubble fits within the budget bubble. If actual expenses are more than budget, then the actual expense bubble can enclose the budget bubble. Immediately it will be apparent to a user where he or she stands with respect to budget.

Third, when the viewing area of a display device available to show graphical representations of budgeting information is small, the bubbles can be shrunk or manipulated or adjusted to fit the screen. They can be shrunk or adjusted to the extent that they are just dots, and the user will still be able to discern whether one bubble is larger than another.

Another feature of the bubbles is that they are fluid and can be moved around the display device by a user depending on the user's placement preferences.

Additional features and advantages of the claimed invention will become apparent upon reading the remainder of this document and viewing the appended drawings.

BRIEF DESCRIPTION OF DRAWINGS

FIG. 5 depicts detail of a particular transaction that a user clicked on in FIG. 4.

DETAILED DESCRIPTION

Figure 3:
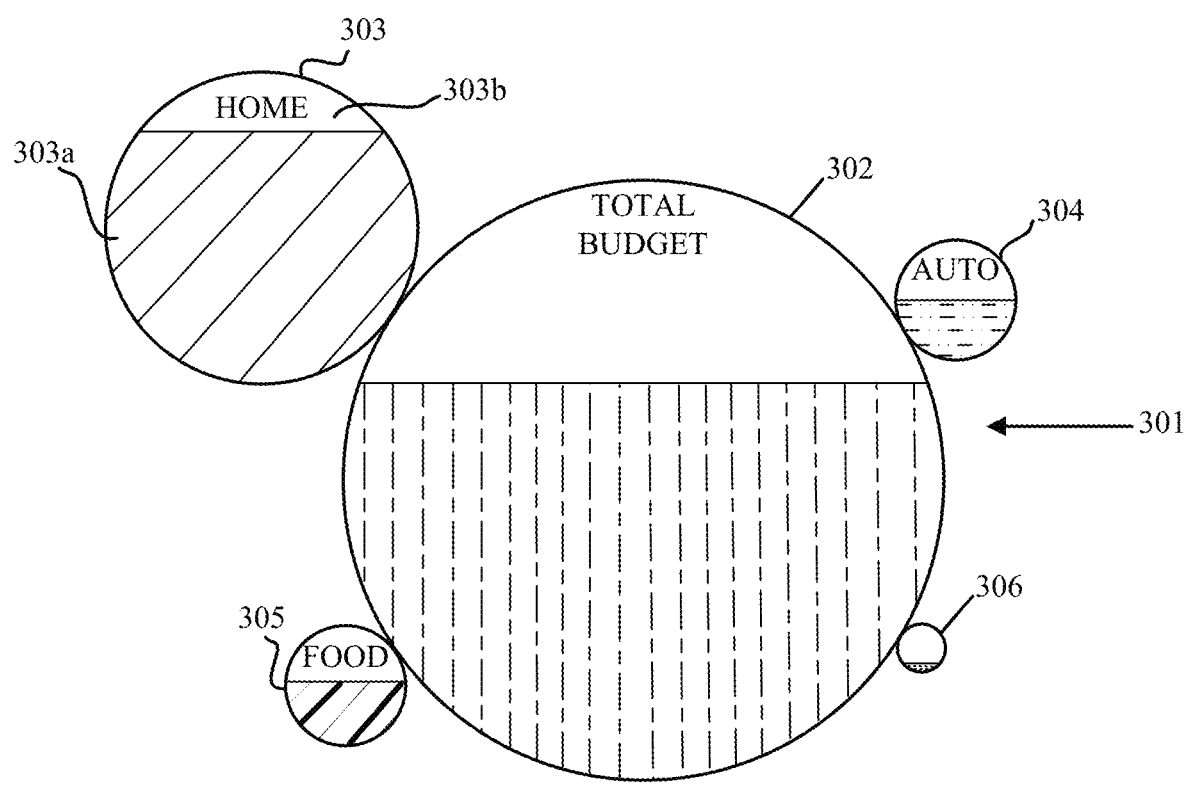
FIG. 3 depicts an example graphical representation of budgeting data using bubbles.

Referring to FIG. 3, an example of graphical representation of budget information using bubbles is depicted 301. A total budget 302 is shown in order to provide the user with a visual comparison of the magnitude of the total budget compared to individual budget items. Individual budget item bubbles for housing 303, auto 304, food 305 and miscellaneous expenses 306 are depicted adjacent the bubble representing the total budget 302. If the bubbles are two-dimensional, then the area contained by bubbles 303, 304, 305 and 306 will equal the area of bubble 302. If the bubbles used in the depiction are three-dimensional, then the volumes of the bubbles will add up to equal the volume of the large bubble, instead of their areas. The reader should note that a total budget representation bubble is optional.

Within each budget category, actual expenses versus budget for that category are shown. For example for budget category 303 for home, the total budget for that category is shown by its bubble. The actual expenses to date for home are depicted by the area or volume 303a, and the remaining budget funds available for that budget category are depicted by the area or volume of 303b. This graphical representation allows a user to intuitively understand at a glance the following information: total budget size, budget category sizes, and the portion of each budget category which has been used to date, allowing a user to plan future spending behavior based on this information.

Figure 4:
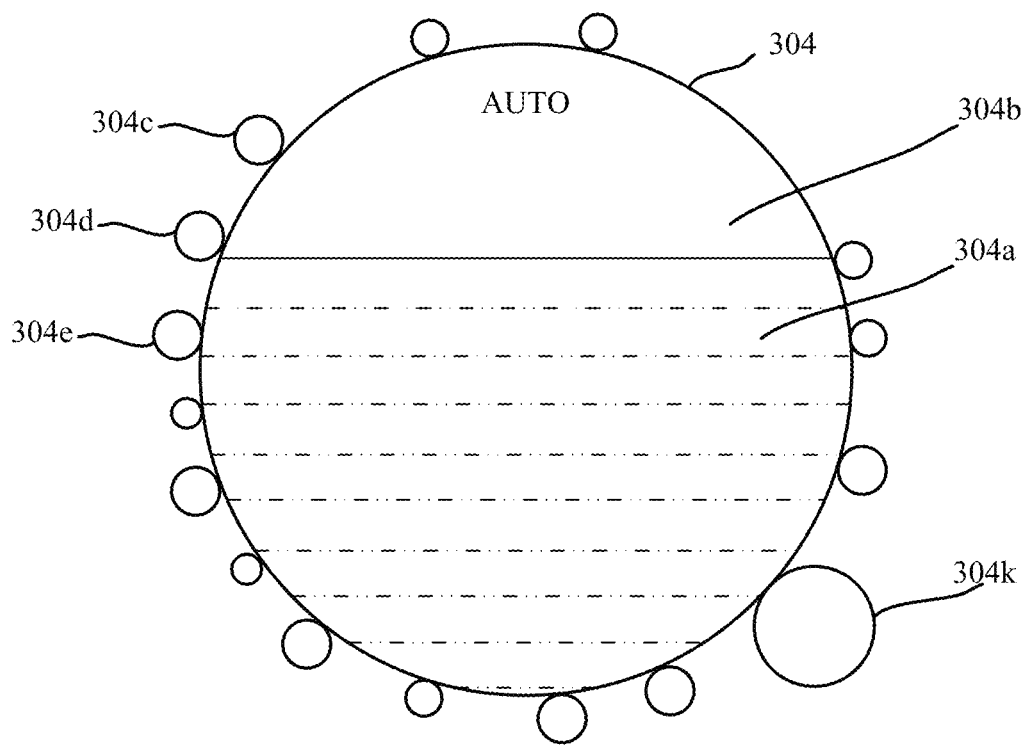
FIG. 4 depicts an example image that may be displayed when a user clicks on a particular budget category from FIG. 3.

If the user clicks on a particular budget category (or sub-budget), such as auto 304, then a new graphic will be shown such as that depicted in FIG. 4. In this graphic, the auto budget 304 is depicted as a bubble, with the used portion of the budget 304a and the unused portion of the budget 304b being depicted in relative surface area or volume proportions as explained above. In addition, further breakdown for that budget is available, as depicted by bubbles 304c, 304d, 304e, etc. whose area (or volume) in sum equals the area (or volume) of the budget 304 with which they are associated. Those bubbles could represent smaller time divisions, such as months in 304c, 304d, 304e, etc., or they could represent individual expense items within the budget 304. In the latter case, if a user clicks on an individual expense item then he or she can see the detail pertaining to that expense item. A user viewing the graphic of FIG. 4 may wonder what the large expense is, and that user may note that such a large expense is hastening him or her toward budget maximum in this budget category. Therefore the user would click on 304k to view the actual expense. That would take him to a new graphic such as that depicted in FIG. 5 where he would be reminded that the category is automobile, the expense number, the subject matter of the expense (such as transmission rebuild, 2001 Honda), and the amount of such expense. A user at this point could employ other features of the application, such as email, share, etc.

Figure 6:
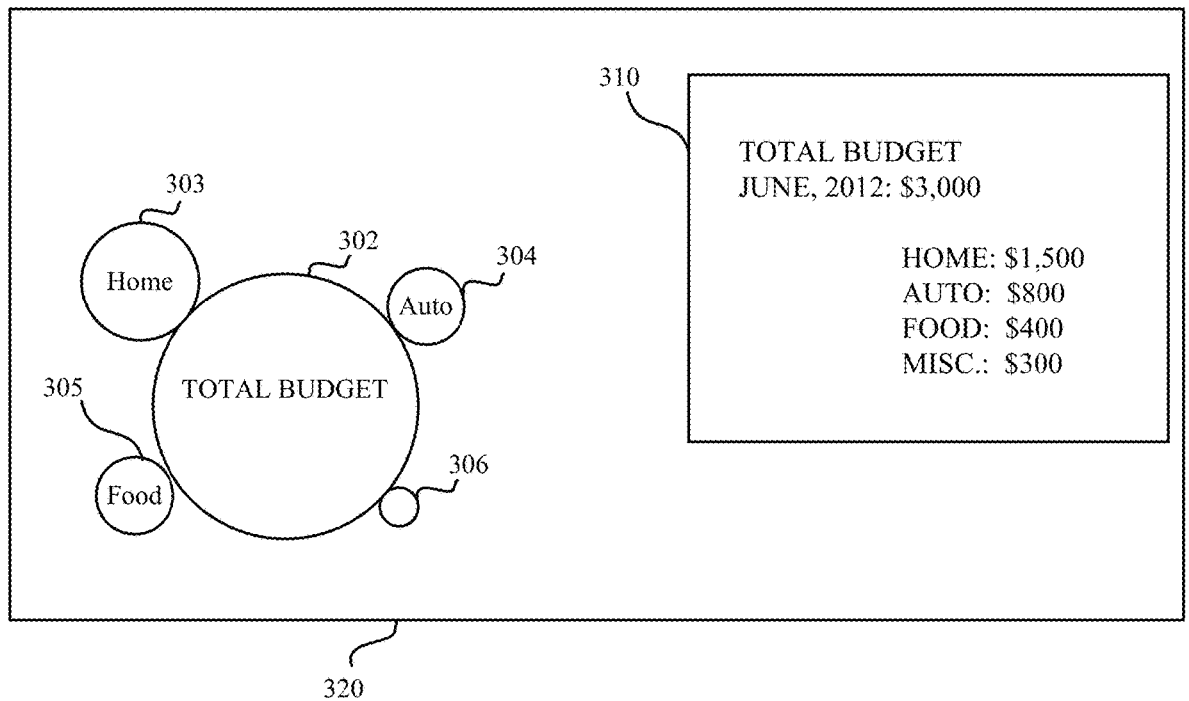
FIG. 6 depicts an alternative visual representation of budgetary information where hard data for budget categories is displayed in addition to bubble graphics.

Referring to FIG. 6, an alternative implementation of the budgeting graphic of FIG. 3 is depicted. In this example, a display device 320 shows the information already discussed with regard to FIG. 3 plus an additional graphic 310. The additional graphic is an, area (or volume) of the computer display device that provides top level data detail for the user to view in conjunction with the graphical representation of the data 302, 303, 304, 305, 306.

Figure 7:
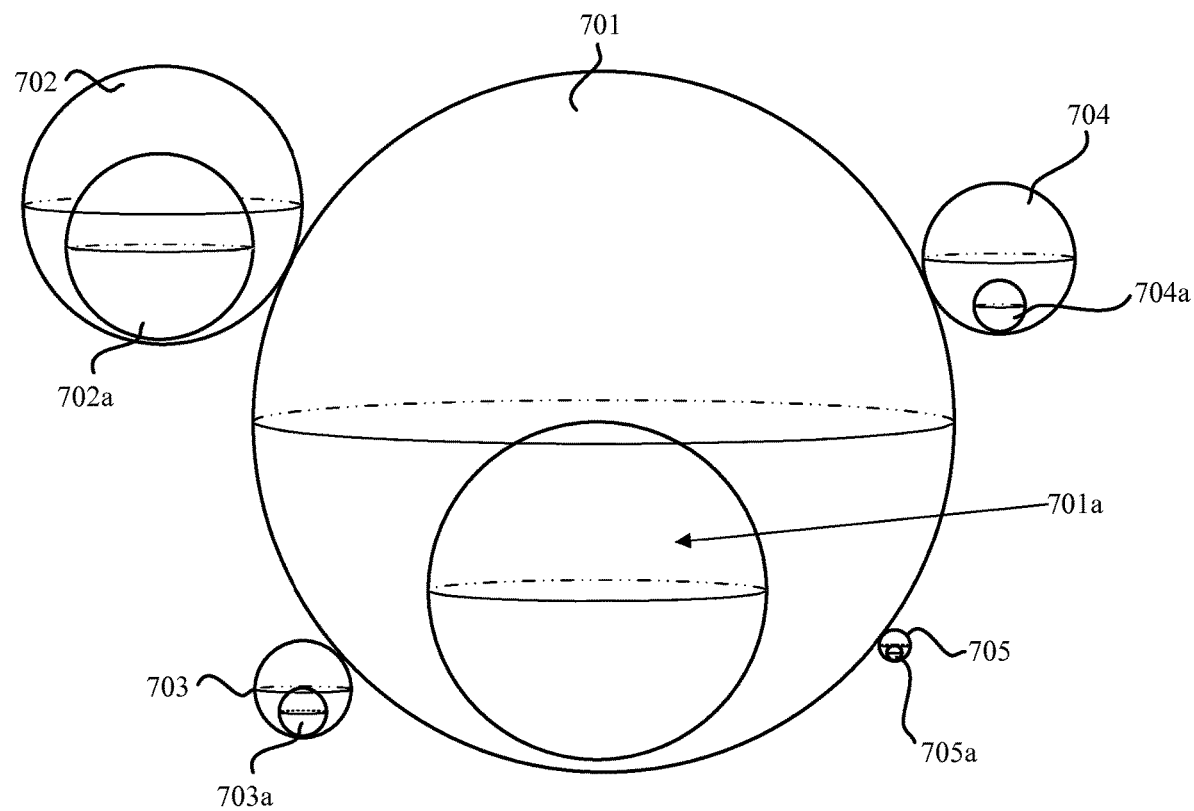
FIG. 7 depicts budgets as spheroids and expenses to date as a spheroid within its parent spheroid budget category.

Referring to FIG. 7, another alternative implementation of the budgeting graphic of FIG. 3 is depicted. In this example, three-dimensional bubbles are used to represent user budgetary information. In this three-dimensional representation, a budget (or sub-budget or budget category) 701 is depicted as a spheroid. Budget categories 702, 703, 704 and 705 are also depicted as being spheroid, although any desired shape can be used. The total volume of the budget categories 702, 703, 704 and 705 equals the total volume of the budget itself 701. Expenses to date within each spheroid are represented as a sub-spheroid 701a, 702a, 703a, 704a and 705a located within its parent spheroid 701, 702, 703, 704, 705. This graphical representation of budgetary data provides the user with an intuitively understandable visual using proportionate bubble graphics for portions of a budget, each graphic having a visual size depiction proportionate to its percentage of the total budget being considered. Intuitively the user will understand the situation with regard to a budget after only glancing at the graphic.

Figure 8:
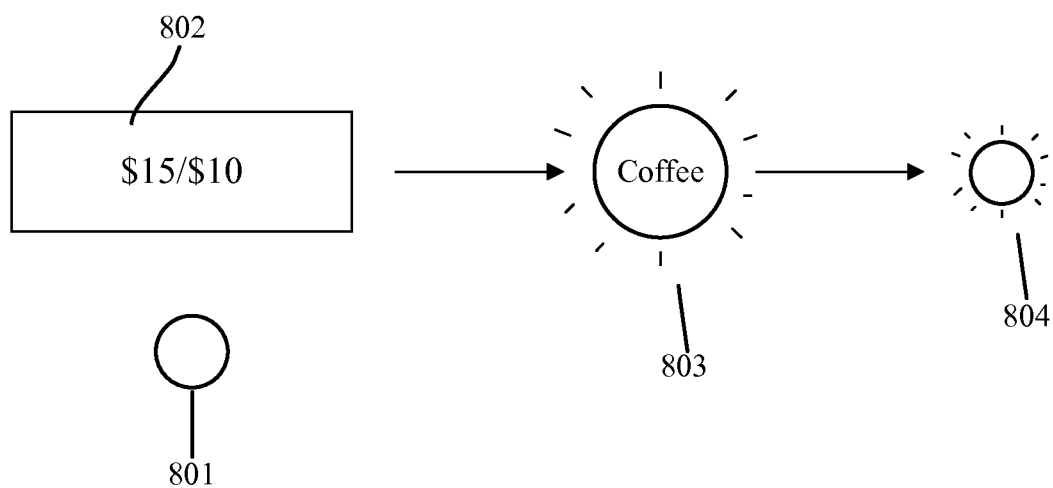
FIG. 8 depicts highlighting a bubble when an item is overbudget.

One feature that may be implemented in the invention is depicted in FIG. 8. In this example, a user has a coffee budget of $10, but he has spent $15 as depicted in numerical data displayed in window 802. In such a case, the system can (a) grow the bubble 803 representing the coffee budget 801 to represent the actual expenditure, (b) make the bubble 803 representing the coffee budget 801 brighter, (c) make the bubble 803 representing the coffee budget 801 colorized as a warning, such as the color red, (d) make the bubble 803 representing the coffee budget 801 blink, and/or (e) make the bubble 803 representing the coffee budget 801 pulsate between its intended budget size ($10) and its actual budget size ($15) in order to both catch the user's attention and in order to graphically inform him of the magnitude of the overage. Alternatively, the graphical representation of the coffee budget 804 could remain at its original size because the dollar value of the overage is small compared to the overall budget.

Figure 9:
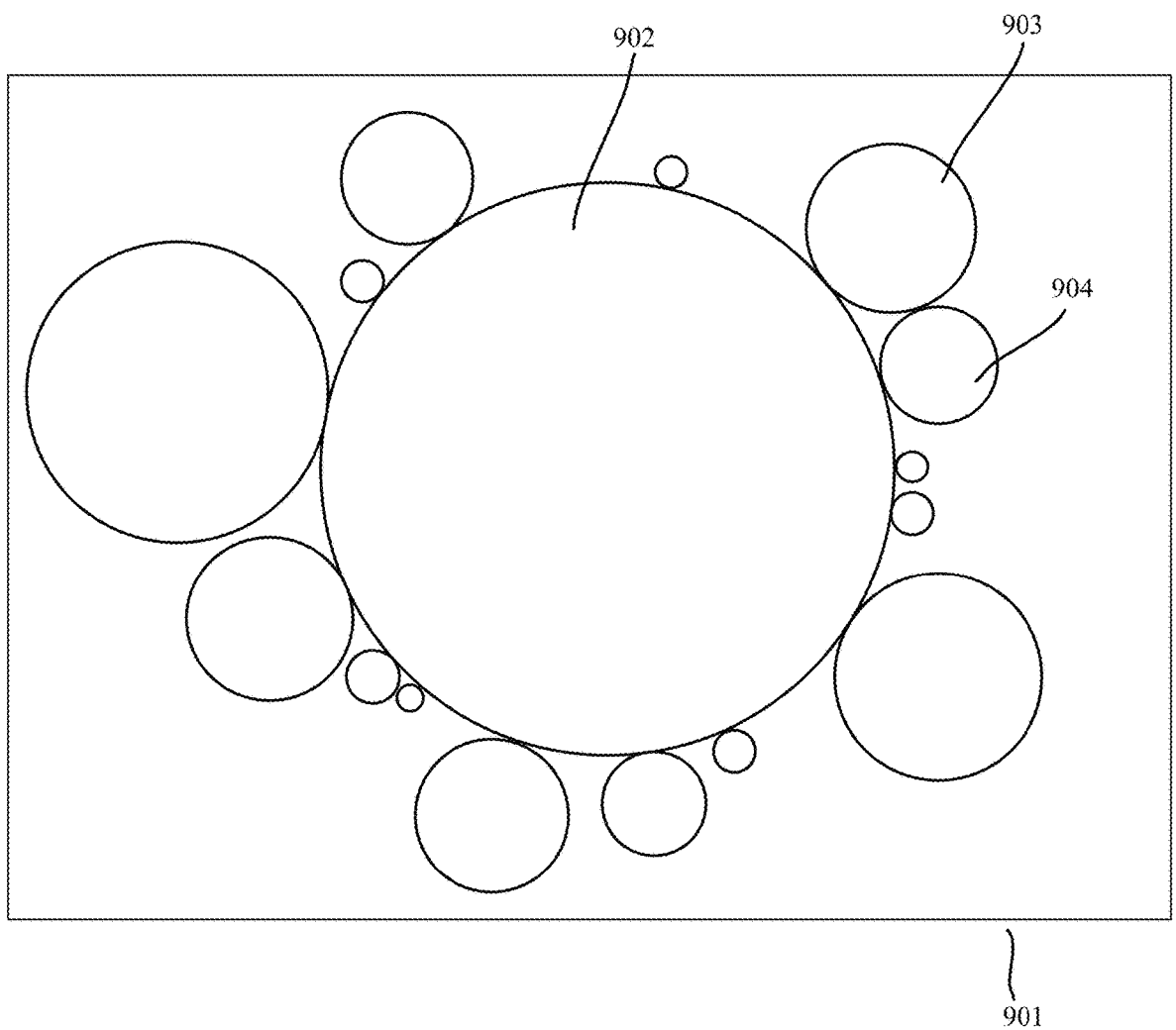
FIG. 9 depicts another embodiment using bubbles.

Referring to FIG. 9, an advantage of the invention is depicted. Budget bubbles such as 902, 903, 904, etc. may be enlarged or shrunk depending on the size of the display device 901 available. Bubbles are easy to enlarge or shrink or otherwise manipulate in proportion to their budget or expenditure amounts, yielding an accurate graphical representation of budgetary information. Other types of graphical representation of data (or widgets) do not have this same advantage.

Figure 10:
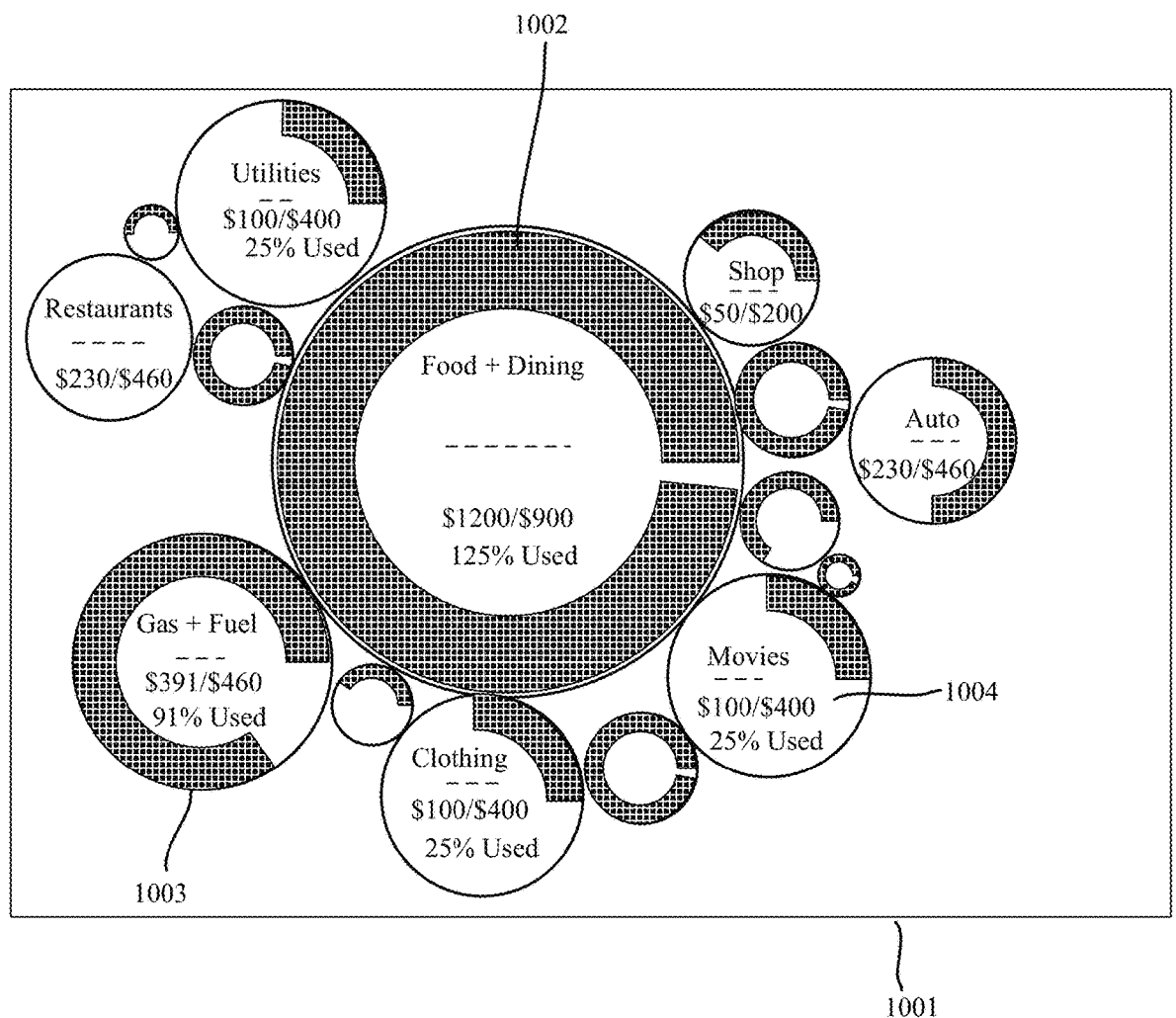
FIGS. 10-12 depict drilling down into a budget item through various screens.
Figure 11:
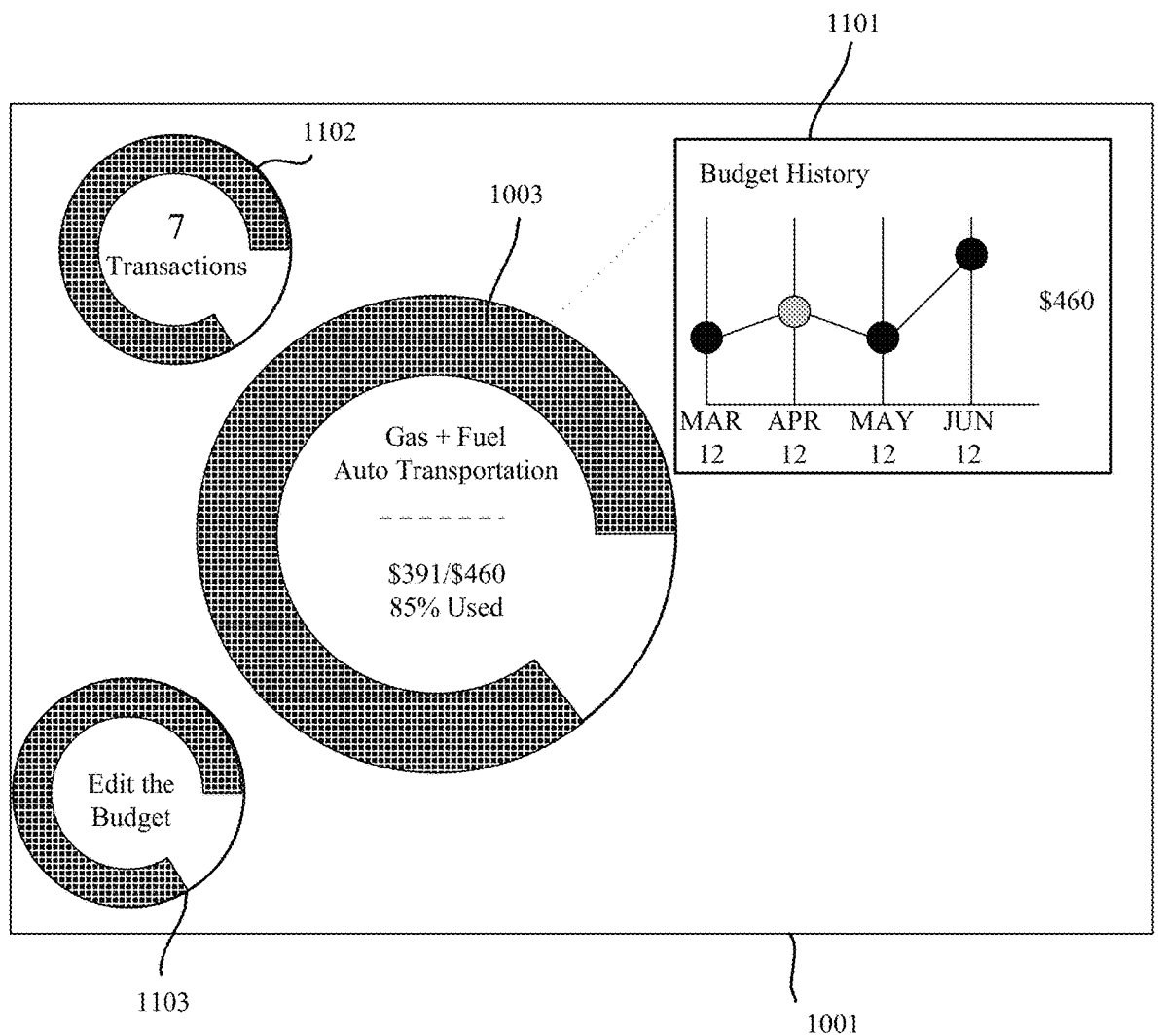
Figure 12:
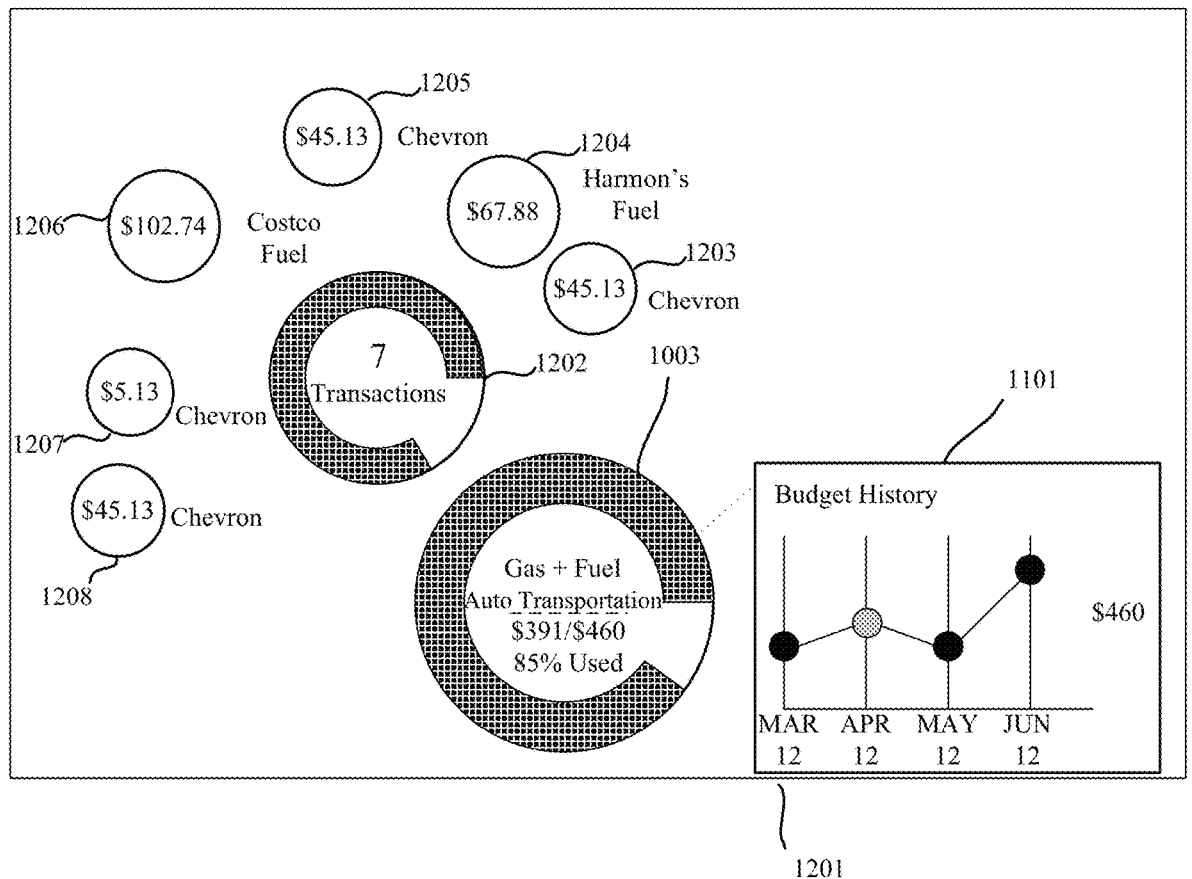

Referring to FIG. 10, other advantages of the invention are depicted. A computer display device 1001 is shown. First, each budget is graphically depicted with a size in proportion to its budget amount. As an example, if the movie budget 1004 is one quarter the dollar amount of the grocery budget 1002, then the area occupied by the movie budget on the computer display device will be one quarter the area occupied by the grocery budget. And if the fuel budget 1003 is one third of the grocery budget 1002, then the area occupied by the fuel budget on the computer display device will be one third the area occupied by the grocery budget. If three dimensional widgets are used to display budgetary information, then the comparison will be volume rather than area. Second, the sub-budget concept is illustrated. If the gas/fuel budget 1003 is clicked, then the computer display device 1001 would display something similar to that shown in FIG. 11.

That shows the auto budget 1003 consisting of certain expenses (gas/fuel) with hard numerical data ($391 actual expenses versus a $460 budget with 85% used). History window 1101 shows budget history for this budget category. An option 1103 is provided for the user to edit this budget. Alternatively, the user can click the transaction bubble 1102 to see the 7 transactions that have taken place within this budget.

Figure 1A:
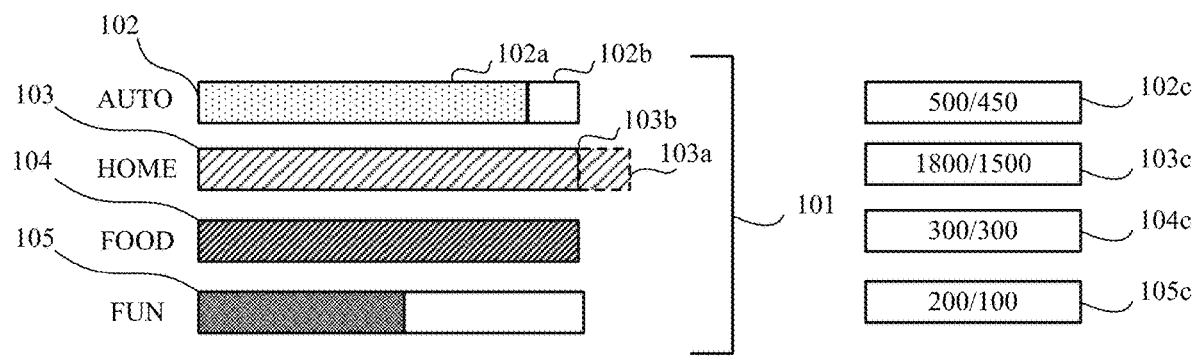
FIGS. 1a-1c depict a prior art budgeting bar graphs.
Figure 1B:
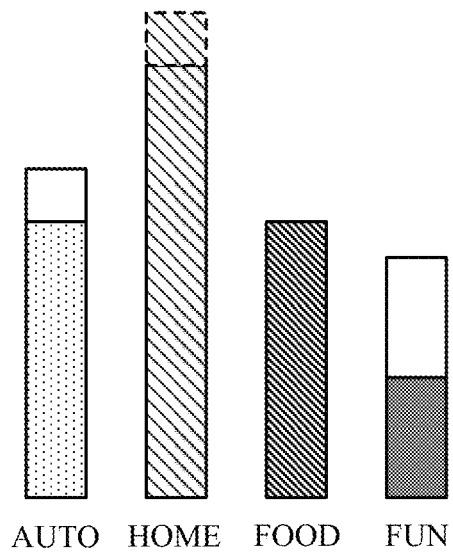
Figure 1C:
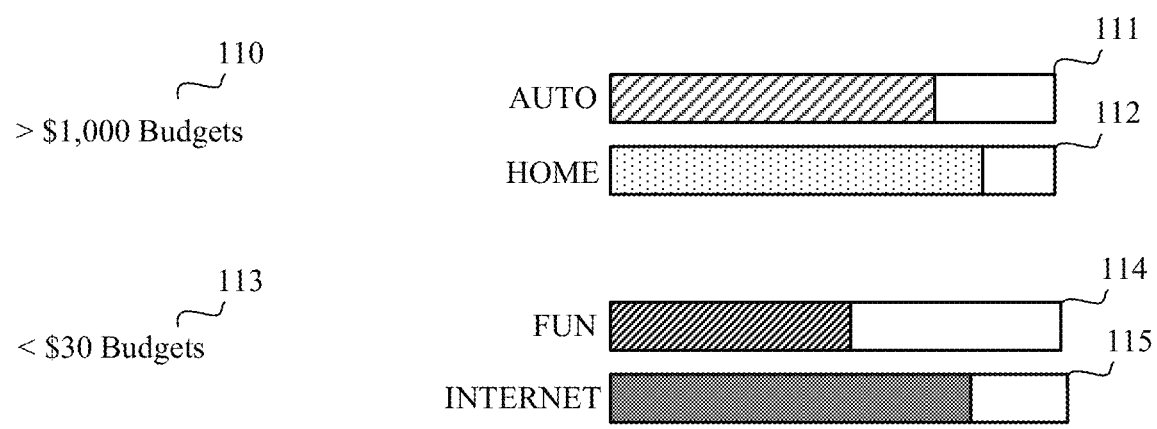
Figure 2:
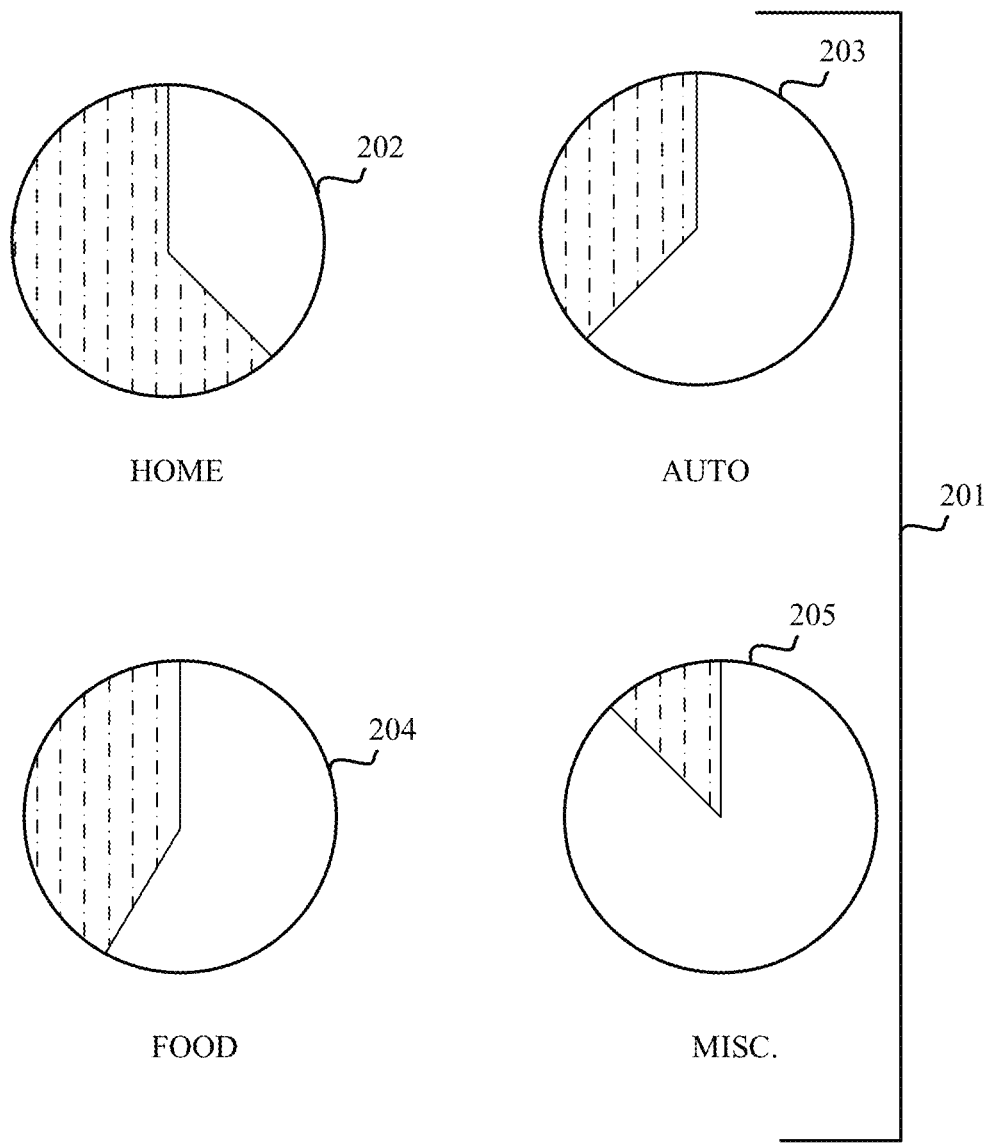
FIG. 2 depicts a prior art budgeting pie chart.

That will take the user to a new screen of the computer display device 1201, shown in FIG. 2 where transaction information is shown, including the history window 1201 showing the budget history. The auto budget 1003 has had 7 transactions, represented by the transaction bubble 1202 shown as 1203 through 1208, with each showing the relevant vendor and transaction amount. Clicking on one of those bubbles 1203 through 1208 would show the user the actual transaction information, such as the credit card charge information for a particular transaction plus any notes the user may have made for that transaction.

Figure 13:
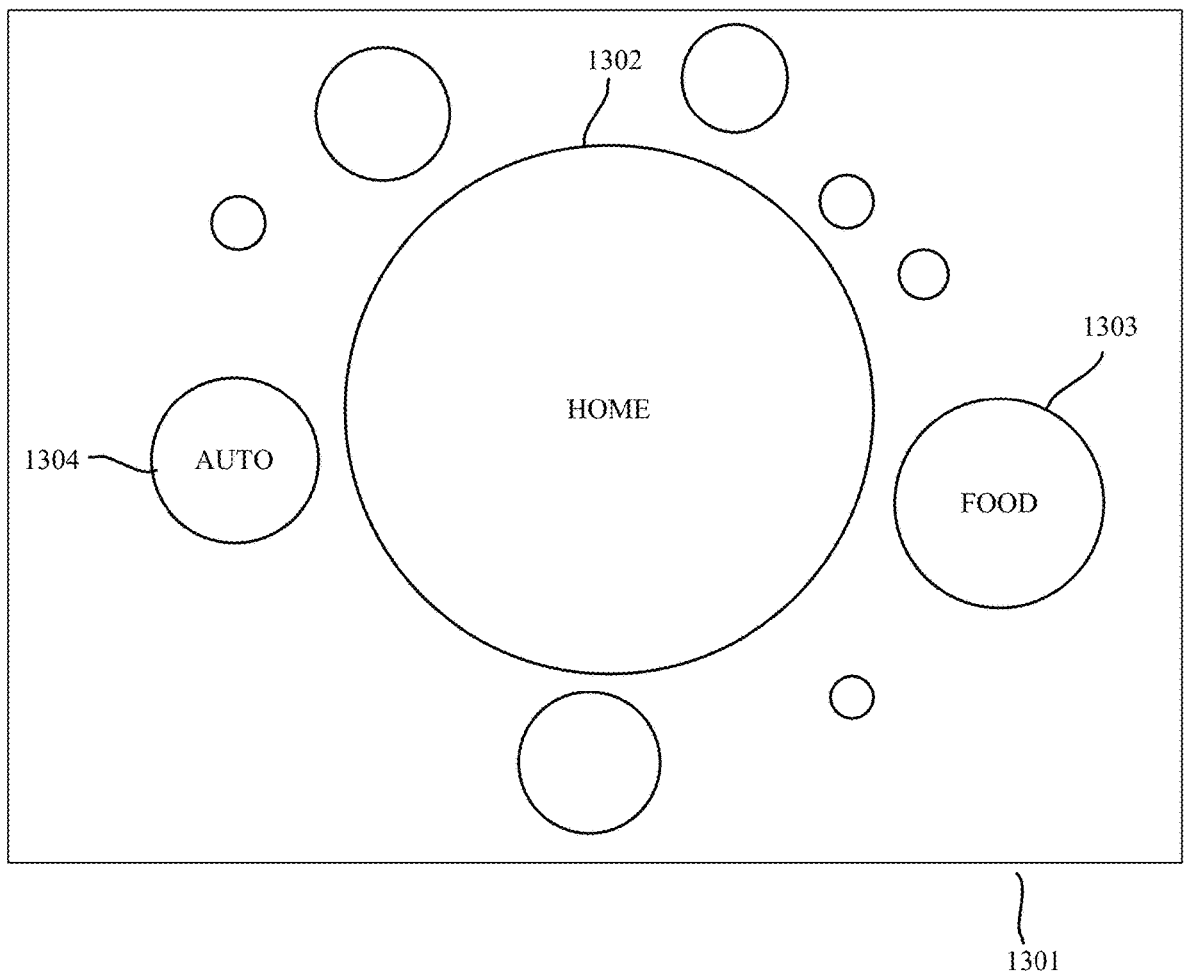
FIG. 13 depicts another embodiment.

FIG. 13 depicts a computer display device 1301 with personal budgeting information displayed by use of a bubble format. Example budgets such as home 1302, food 1303 and auto 1304 are depicted. Note that in this example, there is no total budget bubble, as was shown in FIG. 3. The total budget would be represented by the total surface area of all of the bubbles shown. Each sub-budget is represented by its own bubble.

As a general matter, and without limiting the generality of the examples already discussed, there are numerous ways to represent personal budgetary information using bubbles. A first technique, already covered in some detail, is for each bubble to have a surface area that represents the budgeted amount or the amount spent to date, as desired. A second technique is for the bubbles used to be three-dimensional and in such case, budgetary magnitude will be represented by the volume of the bubbles used, rather than their area. A third technique is to have a bubble represent a budget or sub-budget, and shading, texturizing or colorizing of a portion of the bubble represents expenses to date within that budget. A fourth technique is use of bubbles for budgets and sub-budgets, with pie charts within the bubbles to represent the portion of that budget used to date. A fifth technique is to have bubbles represent budgets, and proportionately-sized circles or other shapes within the bubbles will represent the total expenses to date within that budget. A sixth technique is to use bubbles to represent budgets and place within those bubbles actual numeric data within the bubbles to represent dollars spent to date within that budget category.

As desired, bubbles graphically depicted as described herein may be either colorized or texturized. For example, a bubble representing an expense that is within budgetary limits could be green, while a bubble representing an expense that is above budgetary limits could be red. Instead, the two bubbles could be represented with different textures instead of different colors. Use of colors or textures permits users to quickly see if a budget category is over its budgeted amount.

Over time, as the expenses in a budget category add up to larger and larger amounts, the bubble for that budget category increases in visual size on a computer display. As other bubbles for other budget categories also increase in size over time, the user will gain a visual perception of the relative increase in size of the bubbles depicting various budget categories. For example, the user may recall that last month his auto expense bubble was smaller than his housing expense bubble, but this month the auto expense bubble has grown to be larger than the housing expense bubble.

Another feature that can be provided is the pulsing, blinking, or other light modulation of a bubble which is approaching or has exceeded the budgeted amount. For example, a user may decide that he or she wants to be warned when the expenses in a budget category reach 80% of the budget for that category. In that event, the software can cause the bubble representing that particular budget category to pulse in order to provide the user with a visual warning about spending in that budget area. The pulsing may be performed by making the bubble appear slightly larger and then slightly smaller. Or it may be performed by making the bubble slightly brighter then slightly dimmer. Or the bubble could change colors or textures over time to warn the user. Alternatively, the bubble could change shape, such as changing from a circle to a square and back again, to warn the user.

Another feature is the ability to click on a bubble representing a particular budget category to be able to see all expenses in that category, such as in list format. Once that level of detail is available, a user could click on a particular expense to see the underlying transaction, such as the data for a credit card charge for an auto repair or the actual invoice for the auto repair.

Another feature that would can be implemented is highlighting all budget categories that are approaching their budgetary limit at an above-average rate compared to the other budget categories. Such highlighting can be accomplished with color, light modulation, size, texture, wording, or symbols or an icon.

Another feature that can be implemented is to compare a current budget category, such as a current monthly budget for auto expenses, with prior monthly expenses in that category to determine if current expenses are aberrant compared to the norm. This will allow a user to monitor changes in expenses or behavior over time which may become the norm. For example, if gasoline prices double, that would be reflected in a sustained increase in auto expenses. This will also allow a user to set the new norm as the budget for that budget category.

Typically, the system and method described will be implemented with computer hardware and software. The computer would typically be a digital computer operated by electricity, but could be an analog or biological computing device as well. In a typical system, the computer has memory for storing user data, memory for storing software represented as a list of instructions to the computer, an input device for receiving user data and user instructions, a processing unit for carrying out software instructions and calculations, and a display device for displaying budgeting information graphically in either two or three-dimensional format.

While the present inventions have been described and illustrated in conjunction with a number of specific configurations, those skilled in the art will appreciate that variations and modifications may be made without departing from the principles herein illustrated, described, and claimed. The present invention, as defined by the appended claims, may be embodied in other specific forms without departing from its spirit or essential characteristics. The examples described herein are to be considered in all respects as only illustrative, and not restrictive. All changes which come within the meaning and range of equivalency of the claims are to be embraced within their scope.

The invention claimed is:

1. A computer-implemented method for dynamically resizing bubbles for display in different-sized two-dimensional viewing areas of different computer display devices, the method comprising:

in response to receiving a request to access one larger and at least two smaller bubbles on a two-dimensional viewing area of a larger computer display device, displaying the larger and the at least two smaller bubbles on the viewing area of the larger computer display device with an original surface area of the larger bubble being larger than an original surface area of either of the at least two smaller bubbles and with the at least two smaller bubbles being displayed around a periphery of the larger bubble;

in response to receiving a request to access the larger and the at least two smaller bubbles on a two-dimensional viewing area of a smaller computer display device, shrinking the larger and the at least two smaller bubbles to fit the viewing area of the smaller computer display device in order to display the larger and the at least two smaller bubbles on the viewing area of the smaller computer display device with the shrunken surface area of the larger bubble remaining larger than the shrunken surface area of either of the at least two smaller bubbles;

in response to receiving a request to again access the larger and two smaller bubbles on the larger viewing area of the larger computer display device, displaying the larger and the at least two smaller bubbles to their original surface areas to fit the viewing area of the larger computer display device in order to again display the larger and the at least two smaller bubbles on the viewing area of the larger computer display device; and in response to detecting a change in a status of the larger bubble, increasing the displayed size of the larger bubble.

2. The computer-implemented method as recited in claim 1, wherein the larger and two smaller bubbles are displayed as two-dimensional circular graphical objects.

3. The computer-implemented method as recited in claim 1, further comprising:

in response to receiving updated placement preferences from a user of the larger computer display device, fluidly moving the larger and two smaller bubbles around the larger viewing area of the larger computer display device according to the updated placement preferences.

4. The computer-implemented method as recited in claim 1, wherein:

the larger bubble corresponds to a budget; and the two smaller bubbles correspond to two sub-budgets that each make up only a portion of the budget.

5. The computer-implemented method as recited in claim 4, wherein:

the original surface area of the larger bubble is proportionate to the budget and the original surface areas of the two smaller bubbles are proportionate to the two sub-budgets, respectively; and the shrunken surface area of the larger bubble is proportionate to the budget and the shrunken surface areas of the two smaller bubbles are proportionate to the two sub-budgets, respectively.

6. The computer-implemented method as recited in claim 4, further comprising:

displaying the larger bubble in green while budget expenses are within the budget;

changing the display of the larger bubble to yellow once budget expenses are approaching the budget; and changing the display of the larger bubble to red once budget expenses exceed the budget.

7. The computer-implemented method as recited in claim 4, further comprising:

displaying a text label corresponding to the budget inside the larger bubble;

displaying total expenses numeric data and total budget numeric data corresponding to the budget inside the larger bubble;

displaying percentage of budget spent numeric data corresponding to the budget inside the larger bubble; and not displaying a text label, total expenses numeric data and total sub-budget numeric data, and percentage of sub-budget spent numeric data corresponding to the two sub-budgets inside the two smaller bubbles due to space constraints.

8. The computer-implemented method as recited in claim 4, further comprising:

displaying total expenses numeric data and total budget numeric data corresponding to the budget inside the larger bubble;

displaying percentage of budget spent numeric data corresponding to the budget inside the larger bubble; and displaying total expenses numeric data and total sub-budget numeric data corresponding to the two sub-budgets inside the two smaller bubbles, while not displaying percentage of sub-budget spent numeric data corresponding to the two sub-budgets inside the two smaller bubbles due to space constraints.

9. The computer-implemented method as recited in claim 4, further comprising:

in response to receiving a selection of the larger bubble from a user of the larger computer display device, displaying an edit control proximate the larger bubble; and in response to receiving a selection of the edit control from the user of the larger computer display device, allowing the user to edit the budget.

10. The computer-implemented method as recited in claim 4, further comprising:

displaying a larger icon inside the larger bubble; and displaying smaller icons inside the two smaller bubbles.

11. A computer-implemented method for dynamically resizing bubbles for display in different-sized two-dimensional viewing areas of different computer display devices, the method comprising:

in response to receiving a request to access a budget on a two-dimensional viewing area of a larger computer display device, displaying one larger and at least two smaller bubbles on the viewing area of the larger computer display device, the larger bubble depicting the budget, the at least two smaller bubbles each depicting one of two sub-budgets that each make up only a portion of the budget, the larger and the at least two smaller bubbles being displayed as two-dimensional circular graphical objects, an original surface area of the larger bubble being larger than an original surface area of either of the two smaller bubbles, the two smaller bubbles being displayed around a periphery of the larger bubble;

in response to receiving a request to access the budget on a two-dimensional viewing area of a smaller computer display device, shrinking the larger and the at least two smaller bubbles to fit the viewing area of the smaller computer display device in order to display the larger and the at least two smaller bubbles on the viewing area with the shrunken surface area of the larger bubble remaining larger than the shrunken surface area of either of the two smaller bubbles;

in response to receiving a request to again access the budget on the viewing area of the larger computer display device, displaying the larger and the at least two smaller bubbles to their original surface areas to fit the viewing area of the larger computer display device in order to again display the larger and the at least two smaller bubbles on the viewing area of the larger computer display device; and in response to detecting an increase in expenses to date of the budget, increasing the displayed size of the larger bubble.

12. The computer-implemented method as recited in claim 11, further comprising:

in response to receiving updated placement preferences from a user of the larger computer display device, fluidly moving the larger and two smaller bubbles around the larger viewing area of the larger computer display device according to the updated placement preferences.

13. The computer-implemented method as recited in claim 11, wherein:

the original surface area of the larger bubble is proportionate to the budget and the original surface areas of the two smaller bubbles are proportionate to the two sub-budgets, respectively; and the shrunken surface area of the larger bubble is proportionate to the budget and the shrunken surface areas of the two smaller bubbles are proportionate to the two sub-budgets, respectively.

14. The computer-implemented method as recited in claim 11, further comprising:

displaying the larger bubble in green while budget expenses are within the budget;

changing the display of the larger bubble to yellow once budget expenses are approaching the budget; and changing the display of the larger bubble to red once budget expenses exceed the budget.

15. The computer-implemented method as recited in claim 11, further comprising:

displaying a text label corresponding to the budget inside the larger bubble;

displaying total expenses numeric data and total budget numeric data corresponding to the budget inside the larger bubble;

displaying percentage of budget spent numeric data corresponding to the budget inside the larger bubble; and not displaying a text label, total expenses numeric data and total sub-budget numeric data, and percentage of sub-budget spent numeric data corresponding to the two sub-budgets inside the two smaller bubbles due to space constraints.

16. The computer-implemented method as recited in claim 11, further comprising:

displaying total expenses numeric data and total budget numeric data corresponding to the budget inside the larger bubble;

displaying percentage of budget spent numeric data corresponding to the budget inside the larger bubble; and displaying total expenses numeric data and total sub-budget numeric data corresponding to the two sub-budgets inside the two smaller bubbles, while not displaying percentage of sub-budget spent numeric data corresponding to the two sub-budgets inside the two smaller bubbles due to space constraints.

17. The computer-implemented method as recited in claim 11, further comprising:

in response to receiving a selection of the larger bubble from a user of the larger computer display device, displaying an edit control proximate the larger bubble; and in response to receiving a selection of the edit control from the user of the larger computer display device, allowing the user to edit the budget.

18. The computer-implemented method as recited in claim 11, further comprising:

displaying a larger icon inside the larger bubble; and displaying smaller icons inside the two smaller bubbles.

19. The computer-implemented method as recited in claim 11, further comprising:

in response to receiving a selection of the larger bubble from a user of the larger computer display device, displaying a graph proximate the larger bubble that shows historical expenses for the budget.

20. The computer-implemented method as recited in claim 11, further comprising:
- displaying a ring inside the larger bubble with a first color representing expenses to date in the two sub-budgets; and
- changing the color of the larger ring inside the larger bubble to a second color as the expenses to date change in the two sub-budgets.

\* \* \* \* \*